(12) United States Patent
Kang

(10) Patent No.: US 9,365,200 B2
(45) Date of Patent: Jun. 14, 2016

(54) SAFETY APPARATUS FOR BRAKE OF VEHICLE

(71) Applicant: HANJUNG Co., LTD, Yeongcheon-si, Gyeongsangbuk-do (KR)

(72) Inventor: Pil-Soo Kang, Daegu-si (JP)

(73) Assignee: HANJUNG CO., LTD, Yeongcheon-Si, Gyeongsangbuk-Do (KR)

( * ) Notice: Subject to any disclaimer, the term of this patent is extended or adjusted under 35 U.S.C. 154(b) by 223 days.

(21) Appl. No.: 14/073,381

(22) Filed: Nov. 6, 2013

(65) Prior Publication Data

US 2014/0137551 A1    May 22, 2014

(30) Foreign Application Priority Data

Nov. 21, 2012   (KR) .......................... 10-2012-0132169

(51) Int. Cl.
*B60T 17/22*    (2006.01)
*B60T 13/46*    (2006.01)
*B60T 17/02*    (2006.01)

(52) U.S. Cl.
CPC ............... *B60T 17/226* (2013.01); *B60T 13/46* (2013.01); *B60T 17/02* (2013.01)

(58) Field of Classification Search
CPC ........ B60T 13/46; B60T 17/02; B60T 17/226
See application file for complete search history.

(56) References Cited

U.S. PATENT DOCUMENTS

| | | | | |
|---|---|---|---|---|
| 5,658,131 A   * | 8/1997 | Aoki | ....................... | B60T 13/46 417/17 |
| 2003/0006891 A1 * | 1/2003 | Wild | ....................... | B60T 13/46 340/438 |
| 2010/0114448 A1 * | 5/2010 | Gabor | .................... | B60T 13/46 701/79 |
| 2014/0188359 A1 * | 7/2014 | Chen | ....................... | B60T 13/52 701/70 |

* cited by examiner

*Primary Examiner* — Bradley King
(74) *Attorney, Agent, or Firm* — Hauptman Ham, LLP

(57) ABSTRACT

The safety apparatus for a brake of a vehicle includes a first line and a second line. The first line includes an exhaust manifold, an engine, an intake manifold, a check valve, a vacuum hose, a vacuum switch, a booster, a check valve, a vacuum hose, a negative connection portion, a vacuum switch and a brake booster, and the second line includes a vacuum hose, a check valve, a booster, a check value, a vacuum hose and a vacuum pump, which are connected to the negative connection portion. The apparatus can isolate a supply of electric power to a fuel motor to stop starting of the engine when the brake booster lacks a vacuum because of a deterioration of a performance of an auxiliary vacuum pump, and enable the brake to normally operate so as to prevent an accident even though a sudden acceleration occurs or the engine suddenly stops.

3 Claims, 6 Drawing Sheets

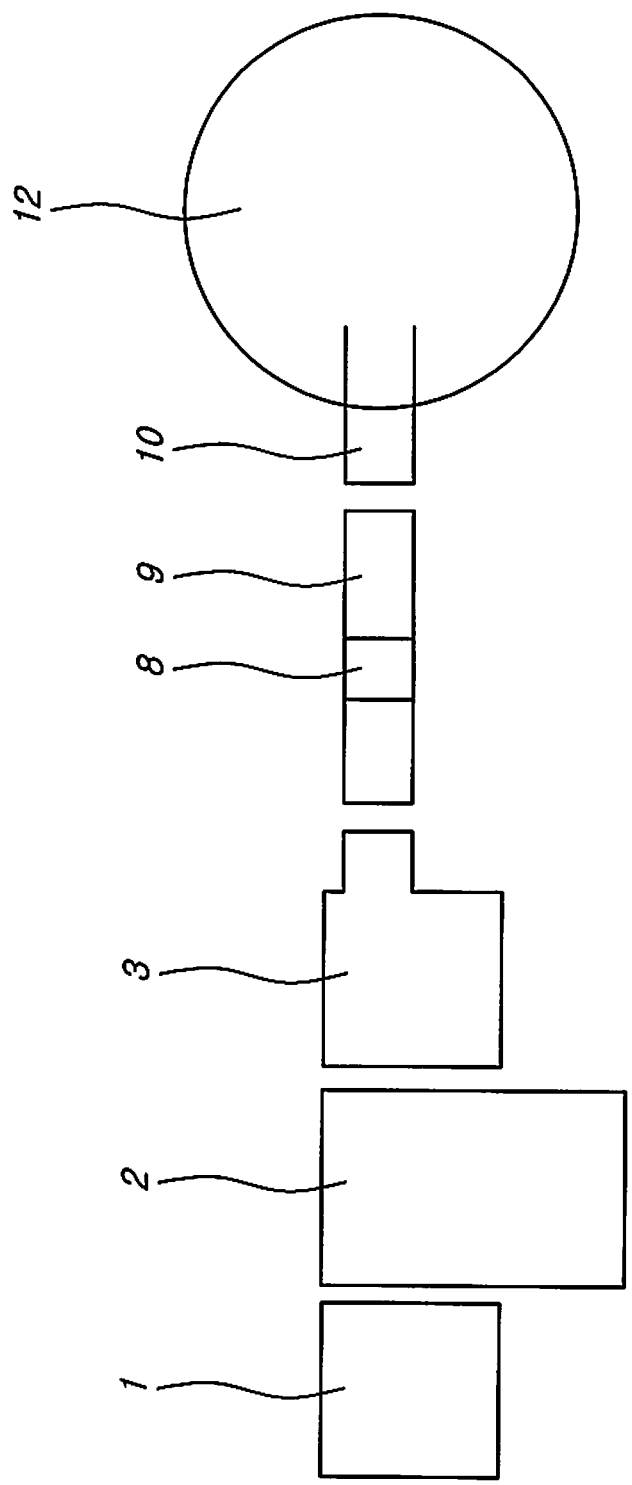
Fig. 1 [a]
PRIOR ART

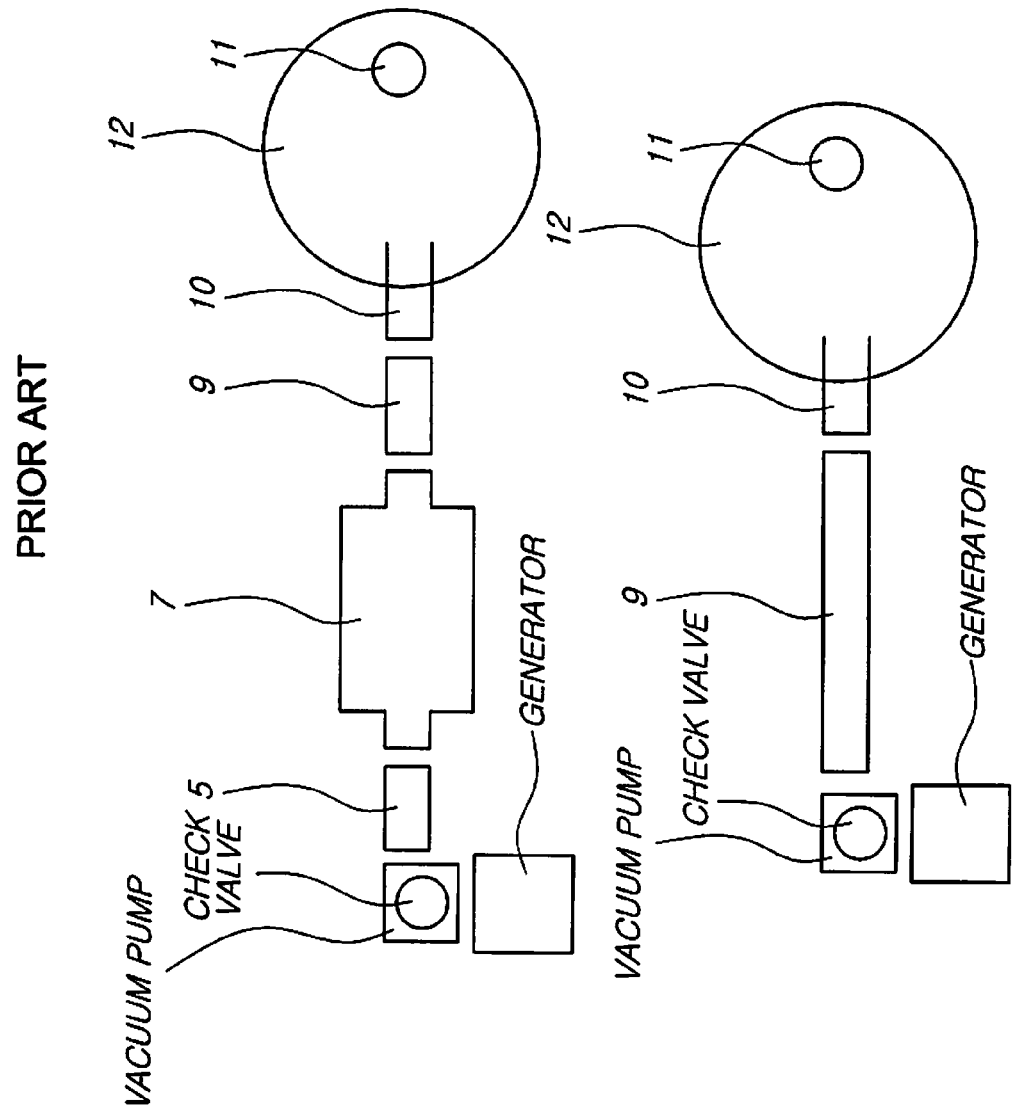
Fig. 1 [b]
PRIOR ART

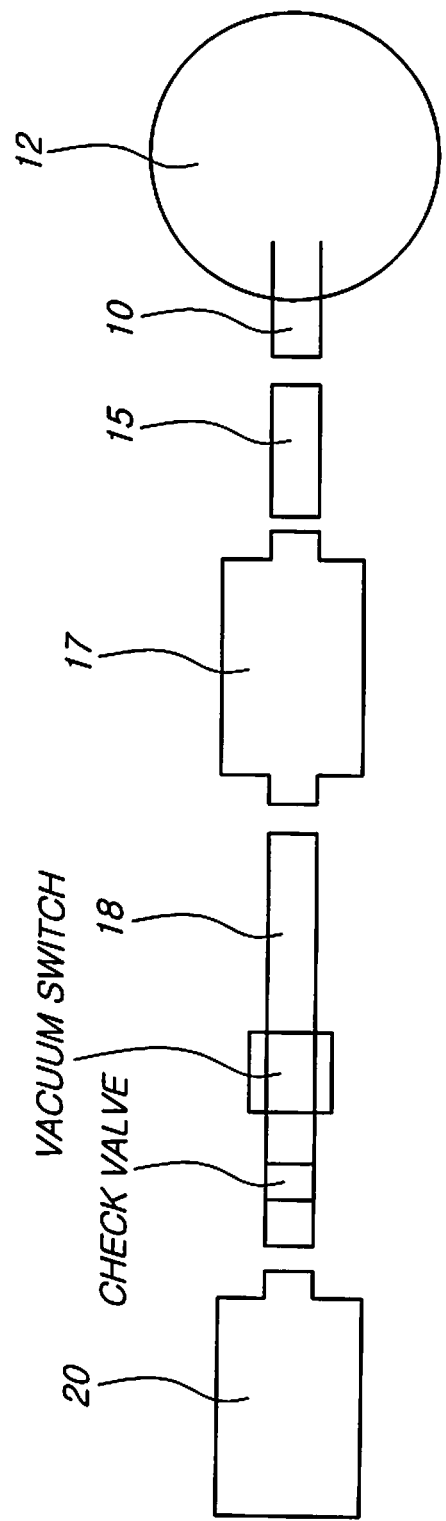
Fig. 1[c]
PRIOR ART

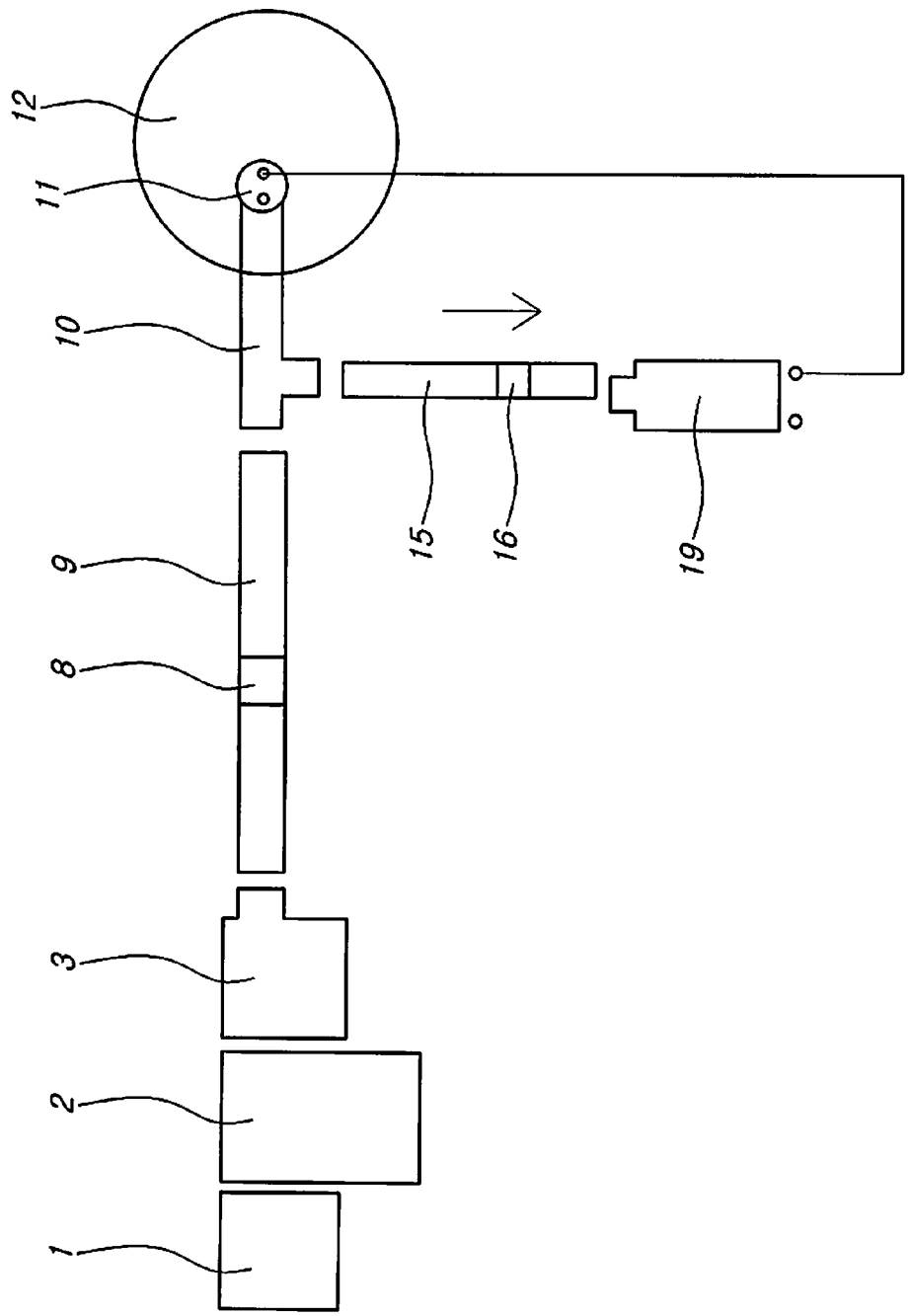
Fig. 1 [d] PRIOR ART

SAFETY APPARATUS FOR BRAKE OF VEHICLE

CROSS REFERENCE TO RELATED APPLICATION

This application claims the priority of Korean Patent Application No. 10-2012-0132169, filed on Nov. 21, 2012 in the KIPO (Korean Intellectual Property Office), which is incorporated herein by reference in its entirety.

BACKGROUND OF THE INVENTION

1. Field of the Invention

The present invention relates to a safety apparatus for a brake of a vehicle, and more particularly a safety apparatus for a brake of a vehicle with an independent brake safety apparatus, in which an auxiliary vacuum pump is driven to normally operate a brake when an intake manifold does not maintain a vacuum due to a sudden acceleration or a stopping of an engine because an ECU, a throttle valve and wire, which are parts relating to the sudden acceleration, malfunction due to a weak durability of the parts caused by impact or due to an introduction of rain water caused by a weak durability and a defect of an exterior material, in which a supply of electric power to a fuel motor is blocked so as to stop an operation of an engine when the brake is abnormally operated because a brake booster is lack of vacuum due to a deterioration of the auxiliary vacuum pump, in which the brake normally operates to prevent an accident even though the sudden acceleration occurs or the operation of the engine is stopped in driving, and in which it is possible to prevent a fade or vapor lock of the brake which may be caused by a lack of a vacuum as the brake is continuously operated when a diesel vehicle is driven on a downhill road.

2. Description of the Prior Art

Generally, an automatic transmission means a transmission gear for automatically changing a speed ratio of wheel to an engine, and a braking system.

The brake system for stopping a driving vehicle is a hydraulic braking system which performs a brake using a hydraulic pressure, and includes a braking pedal, a booster, a master cylinder, a proportional valve, front and rear brake assembly and a brake rotor.

Further, in the brake system, when a driver pushes a brake pedal in order to stop a vehicle, the brake pedal firstly increases force due to its kinematic structure and the booster secondly increases the force. Continuously, the master cylinder converts the force into a hydraulic pressure.

Here, the hydraulic pressure is applied to the brake assembly of each wheel through a brake tube and the proportional valve, and in turn the hydraulic pressure applied to the brake assembly is converted into force again to push a brake pad, thereby applying pressure to the rotating rotor so as to brake the rotor.

A general type of brake system is a combination of a hydraulic torque converter for changing and transmitting a rotation speed and a rotation force by applying a character of fluid, and 2 to 4 speed mechanical transmission which is automatically operated by a hydraulic pressure.

However, in the brake system, the booster amplifies force, which is generated when the driver pushes the brake pedal, by using a negative pressure of an intake manifold according to an operation of an engine. When revolutions of the engine rapidly increase so that the negative pressure of the intake manifold is significantly lowered, the negative pressure applied to the booster is also lowered due to the lowered negative pressure of the intake manifold. Accordingly, there is a problem in that the booster fails to amplify a pressure therein so that a vehicle cannot be stopped even though the driver pushes the brake pedal to increase the hydraulic pressure in order to stop the vehicle.

On the other hand, when using an automatic transmission, since an initial speed of a vehicle is determined based on a position of a transmission gear of the transmission, the vehicle may start at a rapid speed so as to cause a collision accident.

Further, an Electronic Control System (ECU) may make a throttle body malfunction, thereby lowering the negative pressure of the intake manifold. In addition, the ECU may fail to control an ignition control apparatus to make ignition timing irregular, thereby lowering the negative pressure of the intake manifold.

SUMMARY OF THE INVENTION

Accordingly, the present invention has been made to solve the above-mentioned problems occurring in the prior art, and an aspect of the present invention is to provide a safety apparatus for a brake of a vehicle with an independent brake safety apparatus, in which an auxiliary vacuum pump is driven to normally operate a brake when an intake manifold does not maintain a vacuum due to a sudden acceleration or a stopping of an engine because an ECU, a throttle valve and wire, which are parts relating to the sudden acceleration, malfunction due to a weak durability of the parts caused by impact or due to an introduction of rain water caused by a weak durability and a defect of an exterior material, in which a supply of electric power to a fuel motor is blocked so as to stop an operation of an engine when the brake is abnormally operated because a brake booster is lack of a vacuum due to a deterioration of the auxiliary vacuum pump, in which the brake normally operates to prevent an accident even though the sudden acceleration occurs or the operation of the engine is stopped in driving, and in which it is possible to prevent a fade or vapor lock of the brake which may be caused by a lack of a vacuum as the brake is continuously operated when a diesel vehicle is driven on a downhill road.

In order to accomplish this object, there is provided a safety apparatus for a brake of a vehicle. The safety apparatus includes: a first line including an exhaust manifold, an engine, an intake manifold, a check valve, a vacuum hose, a vacuum switch, a booster, a check valve, a vacuum hose, a negative connection portion, a vacuum switch and a brake booster; a second line including a vacuum hose, a check valve, a booster, a check value, a vacuum hose and a vacuum pump, which are connected to the negative connection portion; means for connecting a negative terminal (−) of the vacuum switch connected to the first line to a negative terminal (−) of the brake switch when the intake manifold is lack of the negative pressure, and for applying a negative signal (−) to a four pin relay which converts the negative signal (−) into a positive signal (B+) and applying the positive signal (+) to the vacuum pump connected to the second line so as to supply electric power to the vacuum pump when a brake pedal is in an on-state; means for maintaining the brake booster of the first line in a vacuum state by a side switch which is prepared for a side brake so that a negative signal (−) is applied to the vacuum pump of the second line and applies a negative signal (−) to a four pin relay when the side brake is operated, and simultaneously, makes the four pin relay apply the negative signal to the vacuum pump of the second line so that vacuum occurs in the brake booster of the first line; means for maintaining the brake booster of the first line in the vacuum state by connecting a negative terminal (−) of the four pin relay to a negative terminal (−) of the vacuum pump of the second line when electric power is supplied to an ACC in order to apply a negative signal (−) to the vacuum pump of the second line; and means for controlling a fuel motor so as to isolate electric power when being supplied with electric power through the negative terminal (−) of the four pin relay connected to the negative terminal (−) of the vacuum switch of the brake booster after the positive terminal (+) of the vacuum pump of the second line is connected to a positive terminal (+) of the four pin relay.

According to the present invention, when a performance of an auxiliary vacuum pump is lowered so that a vacuum is insufficient in a brake booster, a supply of electric power to a fuel motor can be isolated so that a starting of a vehicle can be stopped. Moreover, there is an advantage in that an accident can be prevented by only pushing a brake pedal in a sudden acceleration circumstance.

Although a sudden acceleration occurs or an operation of an engine is stopped when driving a vehicle, the brake is normally operated so that an accident can be prevented in advance. Also, when driving a diesel vehicle on a downhill road, although the brake pedal is continuously pushed to cause a lack of a vacuum, it is possible to prevent a brake fade or a brake vapor lock caused due to the lack of the vacuum.

When the brake booster lacks a vacuum so that the brake is abnormally operated at an initial starting of the vehicle, the starting is isolated thereby preventing an accident of a sudden acceleration at an initial starting.

BRIEF DESCRIPTION OF THE DRAWINGS

The above and other aspects, features, and advantages of the present invention will be more apparent from the following detailed description taken in conjunction with the accompanying drawings, in which:

FIGS. 1A to 1D are views illustrating schematic structure of a brake system according to the conventional art;

DESCRIPTION OF THE EMBODIMENT OF THE PRESENT INVENTION

Figure 2:
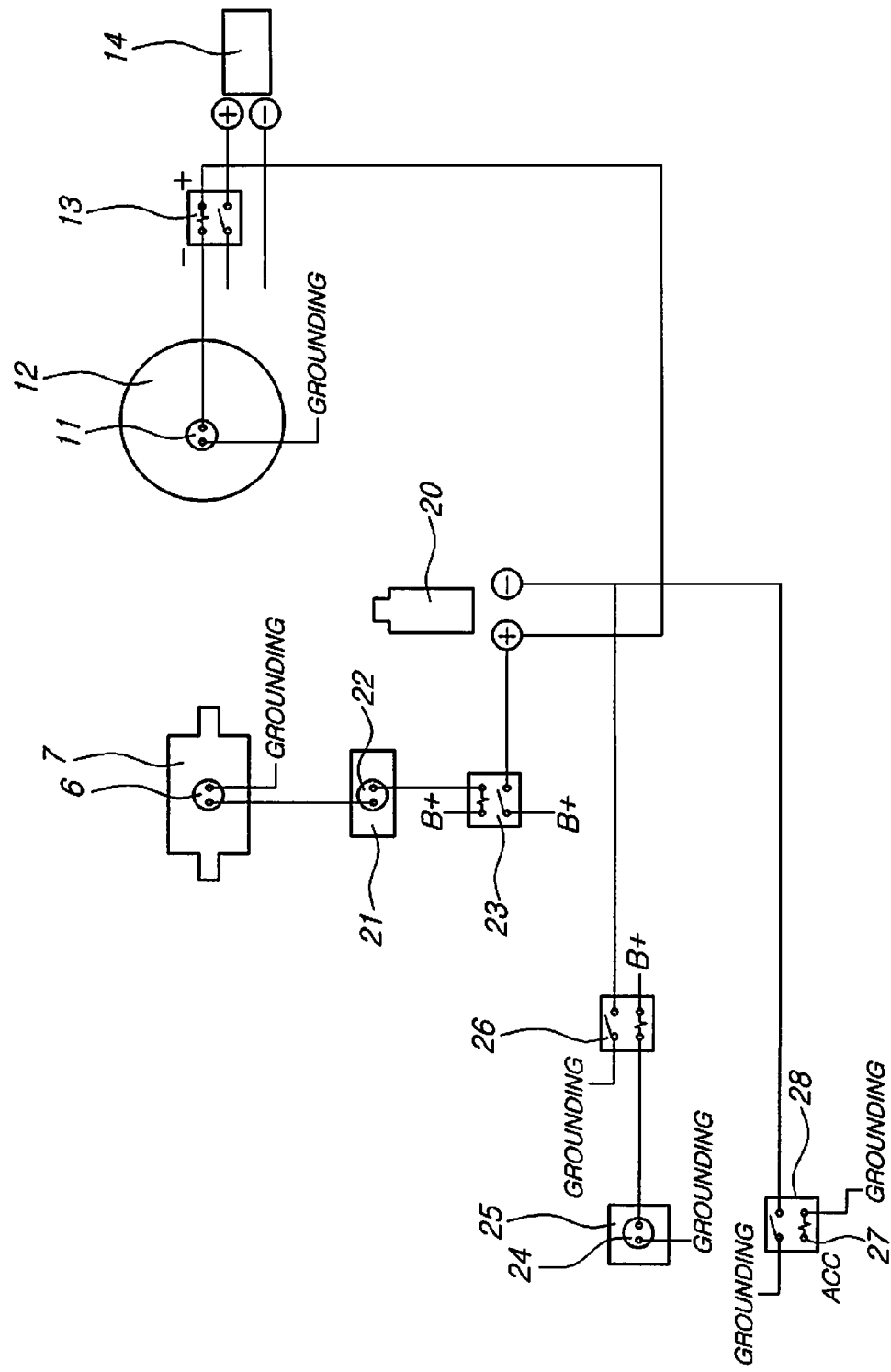
FIG. 2 is a view illustrating a structure of a brake system according to the present invention.

Hereinafter, an embodiment of the present invention will be described in detail with reference to the accompanying drawings to help a person, who is skilled in the art to which the present invention belongs, in carrying out thereof. It will be understood that the present invention may be carried out in various modifications, and is not limited to the embodiment to be described below.

The description of a structure which has no relation to the present invention will be omitted in order to definitely describe the present invention, and identical reference numerals denote the same structural elements throughout the description.

In the description, if a certain unit includes a certain structural element, it means that the certain unit does not control the certain structural element but may additionally include the certain structural element unless there is no an opposing description.

Firstly, a conventional negative pressure typed brake system for a gasoline vehicle includes an exhaust manifold 1, an engine 2, an intake manifold 3, a check valve 8, a vacuum hose 9, a negative pressure connection portion 10, and a brake booster 12, as shown in FIG. 1A.

A negative pressure brake of a diesel vehicle includes a generator, a vacuum pump, a check valve, a vacuum hose 5, a booster 7, a vacuum hose 9, a negative pressure connection portion 10, a brake booster 12, and a vacuum switch 11, or includes a generator, a vacuum pump, a check valve, a vacuum hose 9, a negative pressure connection portion 10, a brake booster 12, and a vacuum switch 11, as shown in FIG. 1B.

A negative pressure brake for a Sportage R, an Equus 4.5, and an electric vehicle which are commercially available, includes a vacuum pump 20, a vacuum hose 18, a check valve, a vacuum switch, a booster 17, a vacuum hose 15, a negative pressure connection portion 10, and a brake booster 12, as shown in FIG. 1C.

On the other hand, a negative pressure brake of an Alpheon manufactured by GM includes a first line which is formed by connecting an exhaust manifold 1, an engine 2, an intake manifold 3, a check valve 8, a vacuum hose 9, a negative pressure connection portion 10, a vacuum switch 11, and a brake booster 12, and a second line which is formed by connecting a negative pressure connection portion 10, a vacuum hose 15, a check valve 16, and a vacuum pump 19, as shown in FIG. 1D.

Figure 3:
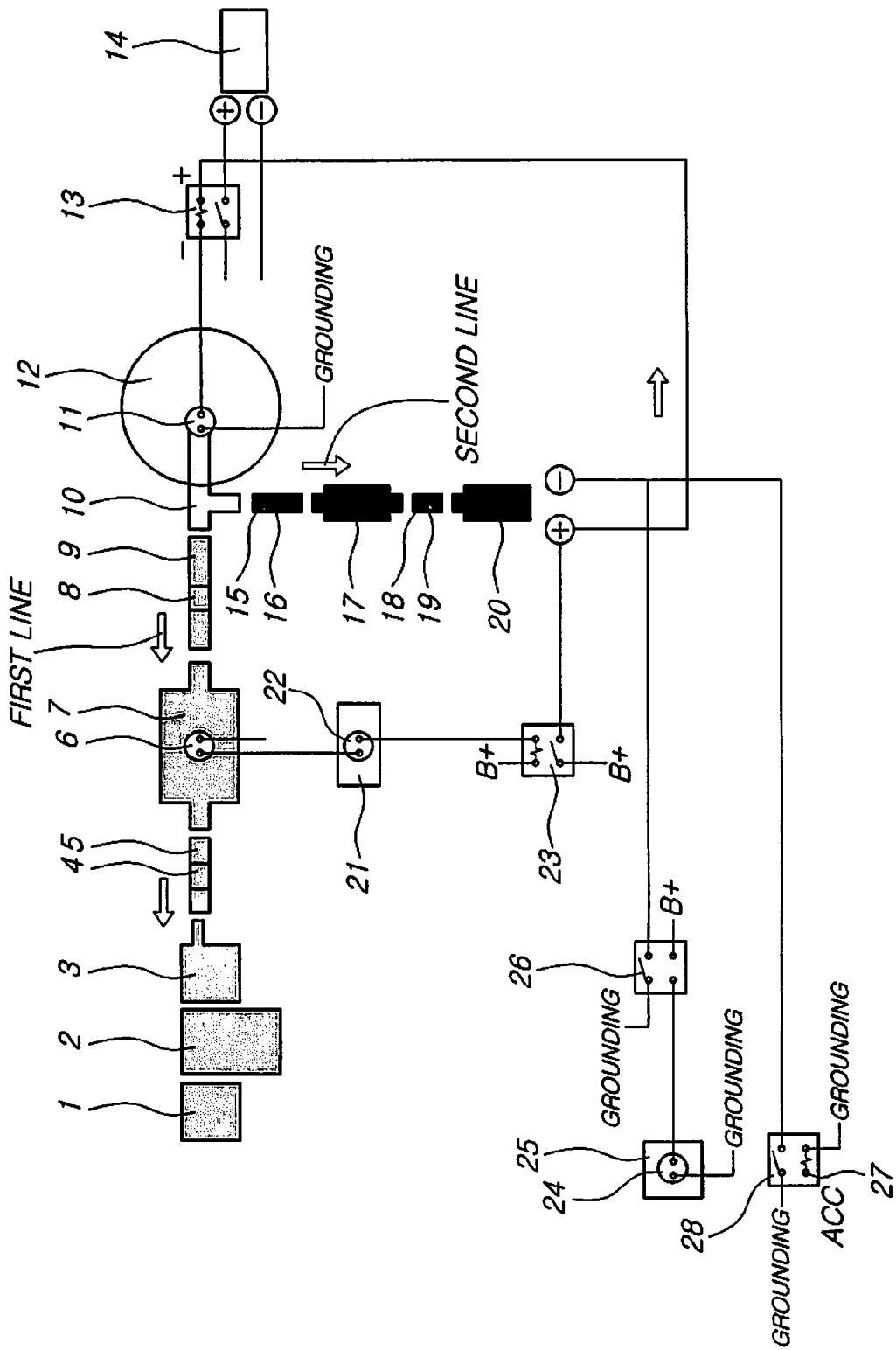
FIG. 3 is a view illustrating a structure of the brake system according to the present invention, in which the brake system is applied to a vehicle.

Accordingly, the present invention includes a first line which is constituted of a manifold 1, an engine 2, an intake manifold 3, a check valve 4, a vacuum hose 5, a vacuum switch 6, a booster 7, a check valve 8, a vacuum hose 9, a negative pressure connection portion 10, a vacuum switch 11, and a brake booster 12, as shown in FIGS. 2 and 3. A vacuum pump 20 operates to measure a negative pressure in the intake manifold 3 when the engine 2 starts.

The safety apparatus for the brake according to the present invention includes a second line which is constituted of the negative pressure connection portion 10, a vacuum hose 15, a check valve 16, a booster 17, a vacuum hose 18, a check valve 19, and a vacuum pump 20.

Here, when the intake manifold 3 is lack of the negative pressure, a negative terminal (−) of the vacuum switch 6 is connected to a negative terminal (−) of the brake switch 22. Then, when a brake pedal 21 is in an on-state, a negative signal (−) is applied to a four pin relay 22. The four pin relay 22 converts the negative signal (−) into a positive signal (B+) and applies the positive signal (+) to the vacuum pump 20 so as to supply electric power to the vacuum pump 20.

A side switch 24 prepared for a side brake 25 and applying a negative signal (−) to the vacuum pump 20 of the second line applies a negative signal (−) to a four pin relay 26 when the side brake 25 is operated. At the same time, the four pin relay 26 applies the negative signal (−) to the vacuum pump 20 of the second line so that a vacuum is created in the brake booster 12 of the first line.

In order to apply the negative signal to the vacuum pump 20 of the second line, when electric power is supplied to an ACC 27, the four pin relay 28 applies the negative signal (−) to the vacuum pump 20 of the second so that a vacuum is created in the brake booster 12 of the first line.

After a positive terminal (+) of the vacuum pump 20 of the second line is connected to a positive terminal (+) of the four pin relay 13, the vacuum pump 20 is supplied with electric power through the negative terminal (−) of the four pin relay 13 connected to the negative terminal (−) of the vacuum switch 11 of the brake booster 12 and controls a fuel motor 14 so as to isolate electric power.

The brake apparatus having the structure as described above, is electrically connected to and associated with the first line and the second line, so as to control the brake.

Here, in the brake apparatus, when the intake manifold 3 is lack of the negative pressure, a negative terminal (−) of the vacuum switch 6 connected to the first line is connected to a negative terminal (−) of the brake switch 22. Then, when a brake pedal 21 is in the on-state, a negative signal (−) is applied to a four pin relay 23. The four pin relay 23 converts the negative signal (−) into a positive signal (B+) and applies the positive signal (B+) to the vacuum pump 20 connected to the second line so as to supply electric power to the vacuum pump 20, thereby maintaining the brake booster 12 in a vacuum state.

A side switch 24 prepared for a side brake 25 and applying a negative signal (−) to the vacuum pump 20 of the second line applies a negative signal (−) to a four pin relay 26 when the side brake 25 is operated. At the same time, the four pin relay 26 applies the negative signal (−) to the vacuum pump 20 of the second line so that a vacuum is created in the brake booster 12 of the first line.

In order to apply the negative signal (−) to the vacuum pump 20 of the second line, when electric power is supplied to an ACC 27, the four pin relay 28 applies the negative signal (−) to the vacuum pump 20 of the second line so that a vacuum is created in the brake booster 12 of the first line.

After a positive terminal (+) of the vacuum pump 20 of the second line is connected to a positive terminal (+) of the four pin relay 13, the vacuum pump 20 is supplied with electric power through the negative terminal (−) of the four pin relay 13 connected to the negative terminal (−) of the vacuum switch 11 of the brake booster 12 and controls a fuel motor 14 so as to isolate electric power.

Check valves 8 and 16 are disposed in front of the boosters 7 and 17 arranged in the first line and the second line, respectively, so as to maintain vacuum pressure in the boosters 7 and 17.

EMBODIMENT

In a case where a negative pressure is measured when an engine is in a sudden acceleration state shown in FIG. 2, the vacuum switch 6 receives a signal and operates the vacuum pump 20 whenever a driver pushes the brake pedal 21.

Here, the four pin relay 23 is used to stably supply electric power to the vacuum pump 20.

Here, the vacuum pump 20 operates when the side brake is locked, and ceases to operate when the side brake is unlocked.

When the brake booster 12 is lack of a vacuum pressure, the vacuum switch 11 operates and the negative terminal (−) of the four pin relay 13 is connected to the positive terminal (+) of the vacuum pump 20 so as to isolate a supply of electric power to the fuel motor 14.

As described above, the brake switch 22, the side switch 24 and the ACC 27 electrically connected to the first line and the second line control the vacuum pump 20 and maintain the boosters 17 and 12 in a vacuum state, so that the driver can operate the brake system in a sudden acceleration circumstance of a vehicle to reduce a speed and to stop the vehicle.

Further, when the first line and the second line have a problem, the four pin relay 13 connected to the fuel motor 14 operates and isolates a supply of electric power to the fuel motor 14.

According to the present invention, when a performance of an auxiliary vacuum pump is lowered so that a brake booster lacks a vacuum, a supply of electric power to a fuel motor can be isolated so that a starting of a vehicle can be stopped.

Moreover, there is an advantage in that an accident can be prevented by only pushing a brake pedal in a sudden acceleration circumstance.

Although a sudden acceleration occurs or an operation of an engine is stopped in a driving of a vehicle, the brake system is normally operated so that an accident can be prevented in advance. Also, in a driving of a diesel vehicle on a downhill road, although the brake pedal is continuously pushed to cause a lack of a vacuum, it is possible to prevent a brake fade or a brake vapor lock caused due to the lack of a vacuum.

Further, if the brake booster lacks a vacuum because the performance of the auxiliary vacuum pump is lowered, a vacuum may not be created in the brake booster and the brake system abnormally operates when the engine starts. In this case, it is possible to isolate a supply of electric power to the fuel motor so as to stop a starting operation of the vehicle.

The above description of the present invention is merely an example, and it will be understood that the present invention can be easily modified in various embodiments without a change of a technical spirit or essential features of the present invention by a person skilled in the art to which the present invention belongs.

Therefore, it is understood that the above described embodiment is an exemplary example and is not limited. For example, the respective structural elements described in a single type may be implemented in distribution, and similarly, structural elements described in a distributed type may be implemented in combination.

The scope of the present invention is defined by claims described later rather than the detailed description, and it will be understood that meanings and scope of the claims, and all changes or modifications derived from an equivalent concept are included in the scope of the present invention.

What is claimed is:

1. A safety apparatus for a brake of a vehicle, comprising:
    a first line including an exhaust manifold (1), an engine (2), an intake manifold (3), a check valve (4), a vacuum hose (5), a vacuum switch (6), a booster (7), a check valve (8), a vacuum hose (9), a negative connection portion (10), a vacuum switch (11) and a brake booster (12); and
    a second line including a vacuum hose (15), a check valve (16), a booster (17), a check value (18), a vacuum hose (19) and a vacuum pump (20), which are connected to the negative connection portion (10), wherein
    when the intake manifold (3) is lack of the negative pressure, a negative terminal (−) of the vacuum switch (6) connected to the first line is connected to a negative terminal (−) of a brake switch (22),
    when a brake pedal (21) is in an on-state, a negative signal (−) is applied to a first four pin relay (23) which is connected to the brake pedal (21), and the first four pin relay (23) converts the negative signal (−) into a positive signal (B+) and applies the positive signal (B+) to the vacuum pump (20) connected to the second line so as to supply electric power to the vacuum pump (20), thereby maintaining the brake booster (12) in a vacuum state, and wherein
    a side switch (24) prepared for a side brake (25) and applying a negative signal (−) to the vacuum pump (20) of the second line applies a negative signal (−) to a second four pin relay (26) which is connected to the side brake (25), when the side brake (25) is operated, and the second four pin relay (26) applies the negative signal (−) to the vacuum pump (20) of the second line so that a vacuum is created in the brake booster (12) of the first line.

2. A safety apparatus for a brake of a vehicle as claimed in claim 1, wherein in order to apply the negative signal (−) to the vacuum pump (20) of the second line, when electric power is supplied to an accessory circuit (ACC) (27), the four pin relay (28) applies the negative signal (−) to the vacuum pump (20) of the second line so that a vacuum is created in the brake boosters (12) and (17) of the first line and the second line.

3. A safety apparatus for a brake of a vehicle as claimed in claim 1, wherein after a positive terminal (+) of the vacuum pump (20) of the second line is connected to a positive terminal (+) of the four pin relay (13), the vacuum pump (20) is supplied with electric power through the negative terminal (−) of the four pin relay (13) connected to the negative terminal (−) of the vacuum switch (11) of the brake booster (12) and controls a fuel motor (14) so as to isolate electric power.

\* \* \* \* \*